United States Patent
Miller et al.

(10) Patent No.: US 6,559,761 B1
(45) Date of Patent: May 6, 2003

(54) DISPLAY SYSTEM FOR VEHICLE ENVIRONMENT AWARENESS

(75) Inventors: Ronald Hugh Miller, Saline, MI (US); Gary Steven Strumolo, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/682,693

(22) Filed: Oct. 5, 2001

(51) Int. Cl.$^7$ ................................................. B60Q 1/00
(52) U.S. Cl. ......................... 340/435; 340/903; 367/909
(58) Field of Search ............................... 340/903, 435, 340/904; 367/909; 180/169; 701/301

(56) References Cited

U.S. PATENT DOCUMENTS

| | | | | |
|---|---|---|---|---|
| 4,467,313 A | * | 8/1984 | Yoshino et al. | 340/904 |
| 4,528,563 A | * | 7/1985 | Takeuchi | 340/903 |
| 4,694,295 A | * | 9/1987 | Miller et al. | 340/903 |
| 4,892,345 A | | 1/1990 | Rachael, III | 296/24.1 |
| 4,934,477 A | * | 6/1990 | Dai | 180/169 |
| 5,173,881 A | * | 12/1992 | Sindle | 367/909 |
| 5,574,443 A | | 11/1996 | Hsieh | 340/901 |
| 5,617,085 A | | 4/1997 | Tsutsumi et al. | 340/903 |
| 5,670,935 A | | 9/1997 | Schofield et al. | 340/461 |
| 5,907,293 A | | 5/1999 | Tognazzini | 340/903 |
| 5,983,161 A | | 11/1999 | Lemelson et al. | 340/436 |
| 6,014,608 A | | 1/2000 | Seo | 340/903 |
| 6,184,781 B1 | | 2/2001 | Ramakesavan | 340/435 |
| 6,184,782 B1 | | 2/2001 | Oda et al. | 340/435 |
| 6,191,704 B1 | | 2/2001 | Takenaga et al. | 340/903 |
| 6,201,642 B1 | | 3/2001 | Bos | 359/565 |
| 6,211,778 B1 | * | 4/2001 | Reeves | 340/436 |
| 6,226,389 B1 | | 5/2001 | Lemelson et al. | 382/104 |

* cited by examiner

*Primary Examiner*—Brent A. Swarthout
(74) *Attorney, Agent, or Firm*—Frank A. MacKenzie

(57) ABSTRACT

An overhead-view display system for a vehicle is provided. The display system comprises a reference vehicle indicator within an overhead field of view and at least three field of view display segments. Each display segment represents a physical region adjacent the reference vehicle and includes a first indicator adapted to display the existence of another vehicle within the region and the relative distance between the reference vehicle and the other vehicle. In another embodiment, each field of view display segment includes a second indicator adapted to represent a direction of change of relative distance between the reference vehicle and the other vehicle, and possibly the vehicle types. Thus, the disclosed display system communicates information on the vehicle's operating environment to the vehicle operator quickly, completely and with minimal driver distraction.

15 Claims, 4 Drawing Sheets

DISPLAY SYSTEM FOR VEHICLE ENVIRONMENT AWARENESS

BACKGROUND OF THE INVENTION

The present invention relates generally to display systems for vehicles, and more particularly, concerns a birds-eye view display system for a vehicle operating environment for indicating the existence of and relative distances to other vehicles proximate the reference vehicle.

Injury, death and financial loss as a result of automobile accidents are some of the greatest concerns in today's society. Improving the safety of our transportation system, including the roads and the vehicles which travel thereon, is an on-going effort. In this regard, vehicle manufacturers continue to make vehicle safety a highest priority. To this end, impressive advances have been made in various areas of technology relating to automotive collision management, avoidance, and warning systems. Numerous patents have been issued which are directed toward detecting objects such as other vehicles or roadside barriers in the environment around a moving vehicle. These include radar and optical based vehicle environment systems. Less attention, however, has been focused on communicating the nature of the surrounding vehicle environment to the vehicle operator.

Many collision avoidance-type systems have either a very simple operator warning such as an alarm or indicator, or very complex and detailed display systems within the vehicle depicting a detailed rendering of the vehicle operating environment. For example, video-based systems merely supplement the driver's point-of-view with the video camera's point-of-view in full detail. Similarly, GPS display systems render the reference vehicle over detailed city and street maps that are often difficult to comprehend at a glance.

Safe driving decisions can best be made with a complete understanding of the surrounding vehicle environment. Thus, it is advantageous to have knowledge regarding the existence of any vehicles proximate to the operator's vehicle, the relationship between the operator's vehicle and any adjacent vehicles, as well as the threat assessment posed by the relative position of adjacent vehicles, i.e., whether they are very near or whether they are rapidly approaching. Vehicle side view mirrors and rearview mirrors can provide partial understanding of the surrounding vehicle environment, but require the vehicle operator to divert his or her attention from the road and provide only a partial view of the area adjacent the vehicle. Furthermore, a glance in the mirror only gives a "snapshot" of the relative positions at a moment in time. The driver cannot get a dynamic picture of the situation (whether surrounding vehicles are converging or diverging from him) unless he stares at the mirrors for some time resulting in a long "eyes-off-the-road" period. Thus, there exists a need for an improved display system for vehicle environment awareness.

SUMMARY OF INVENTION

In the present invention, the aforementioned problem is solved through the provision of an overhead view (birds-eye view) display system for a vehicle which presents, in icon form, the reference vehicle and any vehicles in the surrounding environment with indications of the relative distance to such vehicles as well as the direction of change of relative distance to such vehicles. Thus, in a very simple format, the disclosed display system communicates the vehicle operating environment to the vehicle operator quickly, completely and with minimal driver distraction.

In one embodiment, an overhead-view display system for a vehicle is provided, The display system comprises a reference vehicle indicator within an overhead field of view and at least three field of view display segments. Each display segment represents a physical region adjacent the reference vehicle and includes a first indicator adapted to display the existence of another vehicle within the region and the relative distance between the reference vehicle and the other vehicle. In another embodiment, each field of view display segment includes a second indicator adapted to represent a direction of change of relative distance between the reference vehicle and the other vehicle.

An advantage of the present invention is that it provides a display system that communicates a vehicle's operating environment to a vehicle operator quickly, completely and with minimal driver distraction. Other advantages of the invention will become apparent upon reading the following detailed description and appended claims, and upon reference to the accompanying drawings.

BRIEF DESCRIPTION OF DRAWINGS

For a more complete understanding of this invention, reference should now be made to the embodiments illustrated in greater detail in the accompanying drawings and described below by way of examples of the invention.

In the drawings.

DETAILED DESCRIPTION

In the following detailed description, spacially orienting terms may be used such as "left," "right," "vertical," "horizontal," and the like. It is to be understood that these terms are used for convenience of description of the several embodiments with reference to the accompanying drawings. These terms do not necessarily describe the absolute location and space, such as left, right, upward, downward, etc. that any part must assume.

Figure 1:
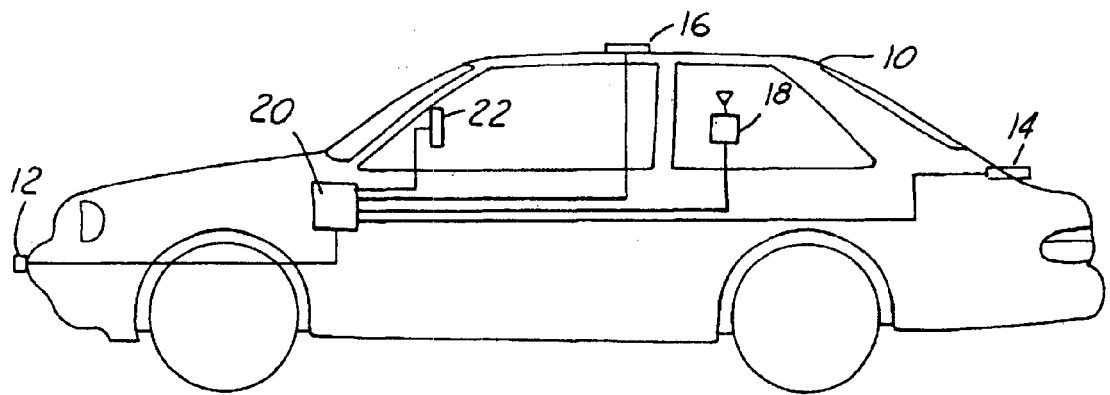
FIG. 1 is a schematic view of a vehicle equipped with a display system for vehicle environment awareness according to one embodiment of the present invention.

Referring now to FIG. 1 there is shown a schematic diagram of a vehicle equipped with a display system in accordance with an embodiment of the present invention. The vehicle 10 includes a plurality of environmental awareness sensing systems to help locate the vehicle 10 either in absolute terms, or with regard to objects or other vehicles proximate to the vehicle 10. Thus, for example, the vehicle 10 may be equipped with fore and aft sensing systems 12, 14 that may be optical-based systems or radar-based systems for sensing objects in front of and behind the vehicle 10. Alternatively, or in addition, vehicle 10 may be equipped with a turret-type sensing system 16 which is capable of detecting objects or vehicles in a field of view 360° about the vehicle 10. Vehicle 10 may further include a GPS system 18 for locating the vehicle in absolute terms as is known in the art. Surrounding vehicles may also communicate their position, obtained from their own GPS systems, wirelessly to vehicle 10 to provide the data needed for relative positioning. All other mechanisms that are known for orienting the vehicle 10 with respect to its surrounding environment are contemplated by the present invention. The primary concern of the present invention is how the data collected by sensing systems 12, 14, 16 and 18 is communicated to the vehicle operator to provide environmental awareness feedback.

The information and data collected by the sensing systems 12, 14, 16 or 18 is communicated to controller 20 for processing and displaying on a screen or display 22 presented to the vehicle operator. The display 22 could be incorporated in a separate screen mounted in or on the dash within the driver's field of view, or on an existing navigation screen already in the vehicle, or as part of a heads-up display system providing other information to the driver.

The controller 20 is preferably a microprocessor-based controller having associated inputs, outputs, a communication bus, and memory such as RAM and ROM. Controller 20 may be a stand-alone controller independent from the vehicle powertrain control module (PCM) or the controller 20 may be integrated therewith. Controller 20, if independent from the PCM, may be in communication therewith as part of an active or passive collision avoidance scheme.

Display 22 is a screen-based display such as LCD, LED or CRT display, or may be implemented as a head's-up display (HUD) overlaying the forward vision of the vehicle operator through the vehicle windshield. Any other known display mechanisms are also contemplated by the present invention.

Figure 2:
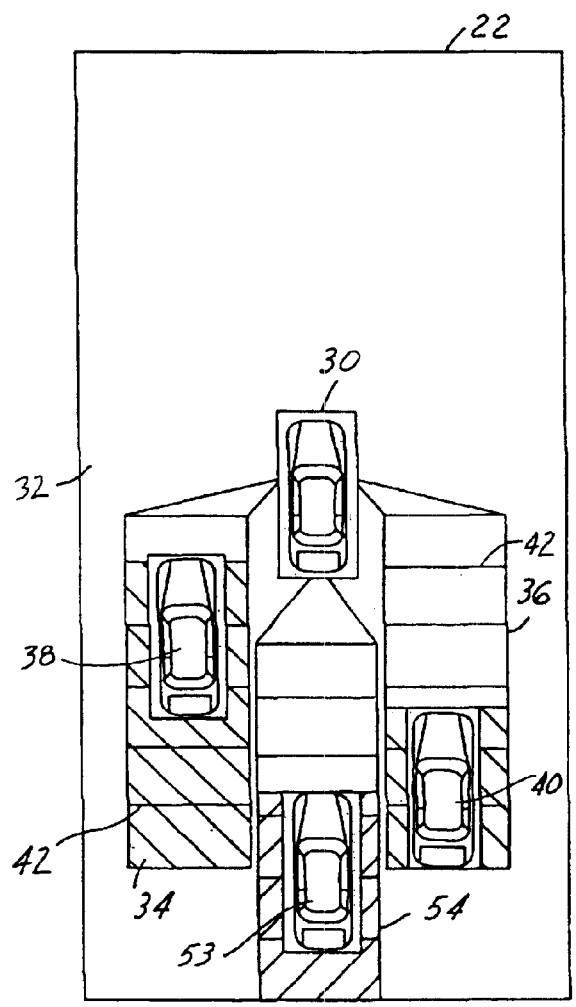
FIG. 2 is schematic view of a vehicle environment awareness display system according to an embodiment of the present invention.

Referring now to FIGS. 2–9 there are shown various embodiments of the contents of the display 22 in accordance with the present invention. Turning first to FIG. 2, the display 22 presents a reference vehicle icon 30 representing the vehicle 10 operating within an overhead or "birds-eye" field of view 32. The overhead field of a view 32 includes a plurality of display segments 34, 36, 54 which each represent a physical region adjacent the actual vehicle 10 as represented by reference vehicle 30. The display segments 34, 36, 54 are used as described below to communicate information gathered from the vehicle environmental sensory systems such as those described with reference to FIG. 1.

In the embodiment shown in FIG. 2, three field of view display segments 34, 54, 36 are shown which represent the environment to the left and rearward of the vehicle 30 directly rearward of the vehicle 30, and to the right and rearward of the vehicle 30, respectively. Each display segment 34, 36, 54 includes several features to quickly, accurately, and completely communicate to the vehicle operator information regarding the physical regions adjacent the vehicle represented thereby. Accordingly, each display segment 34, 36, 54 includes a first indicator 38, 40, 53 which is activated to represent the existence of another vehicle within the region represented by the respective display segment. The first indicators 38, 40, 53 could be displayed as icons similar to the reference vehicle icon 30, or may be a simplified indicator such as merely a circle, square or triangle, or the like.

The location of each first indicator 38, 40, 53 within its respective display segment 34, 36, 54 is a function of the relative distance between vehicle 10 as represented by reference vehicle 30 and the detected vehicle as represented by first indicator 38, 40, 53 as ascertained by the vehicle environmental sensory systems. The relative distance between the vehicle 10 and the detected vehicle is communicated to the vehicle operator by positioning the icon 38, 40, 53 along the display grid 42 wherein each grid line is related to an absolute or relative distance between the vehicle 10 and the detected vehicle. Thus, for example, if the grid lines are calibrated to represent 5 feet of actual distance, the detected vehicle represented by icon 38 would be approximately inline with the rear bumper of the vehicle 10 whereas the detected vehicle represented by icon 40 would be in the lane to the right of vehicle 10 and approximately 20 feet behind the rear end of the vehicle 10.

In addition to the relative position of the detected vehicle icons 38, 40, 53 with respect to the reference vehicle 30 for indicating relative distances therebetween, the display segments 34, 36, 54 can also be colorized to convey similar information. Thus, if the detected vehicle as indicated by icon 38 is indicated as being too close to allow, for example, a left lane change by the vehicle as represented by icon 30, the segment 34 can be illuminated red either in its entirety or commensurate with the leading edge of the icon 38. In a similar manner, a safe distance from a detected vehicle such as represented by icon 40 can be indicated by colorizing the display segment 36 green either in its entirety or commensurate with the leading edge of the detected vehicle as shown in FIG. 2.

If the rungs of the grid 42 are calibrated to indicate segments equivalent to 5 feet, the color scheme of the associated display segments could be red for detected vehicles within 5 feet of the reference vehicle, yellow for detected vehicles between 5 feet and 10 feet from the reference vehicle, and green for detected vehicles greater than 10 feet from the rear bumper of the reference vehicle 30. In this way, the vehicle operator can determine at a glance whether a left or right lane change can be executed safely. Of course, other colors can be used to convey the same information. Preferably, red, yellow and green are used, however, due to their significance as traffic flow indicators.

Alternatively, the colorization scheme can act as a second indicator for each display segment by indicating the direction of change of relative distance between the vehicle and a detected vehicle. Thus, as shown in FIG. 2, display segment 34 may be colorized red to indicate that detected vehicle as represented by icon 38 is approaching the reference vehicle 30. In a similar manner, display segment 36 can be colorized green to indicate that the relative distance between the reference vehicle 30 and detected vehicle 40 is increasing.

Figures 3, 4:
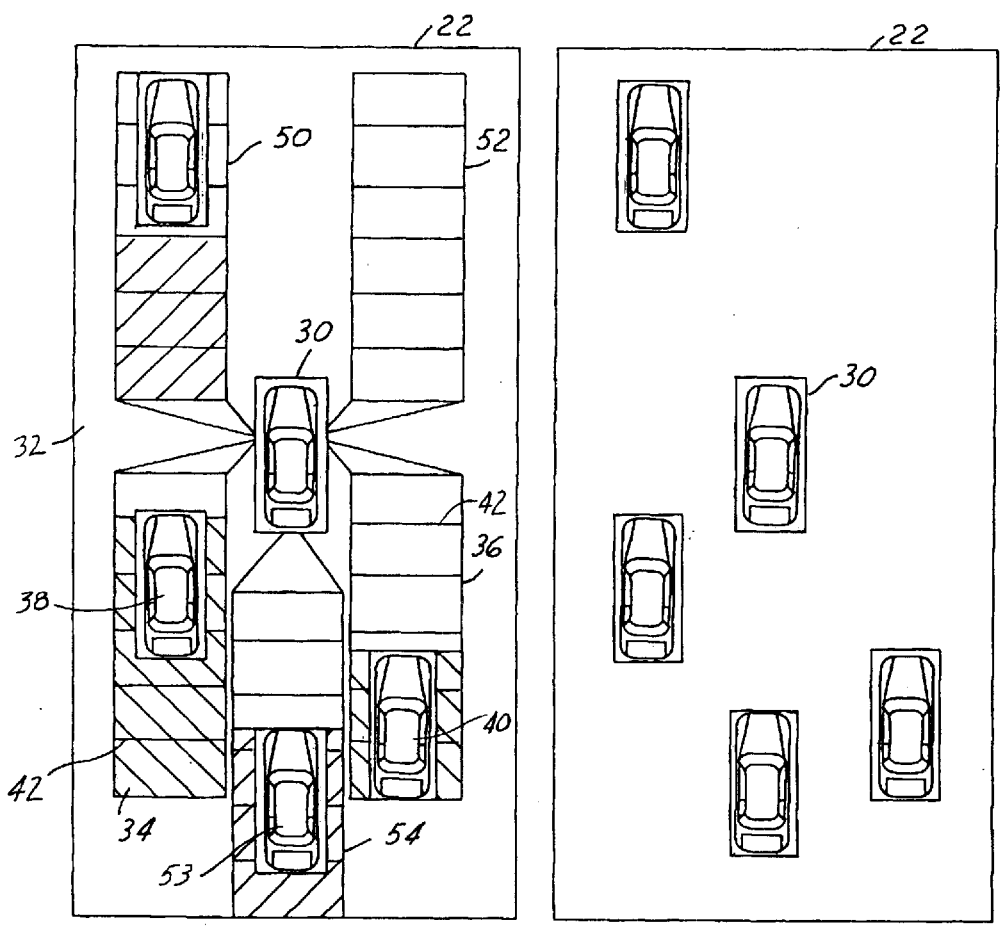
FIG. 3 is schematic view of a vehicle environment awareness display system according to another embodiment of the present invention.
FIG. 4 is schematic view of a vehicle environment awareness display system according to another embodiment of the present invention.

Referring now to FIG. 3 there is shown another embodiment of the vehicle environment awareness display system according to the present invention. The display system of FIG. 3 is the same as that of FIG. 2 with the addition of forward looking display segments 50, 52. In the example shown in FIG. 3, four vehicles are detected in the region surrounding the driven vehicle as represented by the icons in segments 34, 36, 50 and 54. In addition, segments 50 and 54 are colorized green, for example, to indicate that the relative distance between the driven vehicle and the detected vehicles is increasing, while segments 34 and 36 are colorized red, for example, to indicate that the relative distance between the driven vehicle and the detected vehicles is decreasing. Alternatively, the red color could be used to indicate that the vehicle is too close for a lane change maneuver to be made while the green would indicate that such a maneuver would be safe. Display segment 52 is inactive which indicates that no vehicles are detected in the region forward and to the right of the driven vehicle as represented by reference icon 30.

Referring now to FIG. 4, another embodiment of the vehicle display system in accordance with an embodiment of the present invention is shown. The display system of FIG. 4 is the same as the display system of FIG. 3 with the change of distance information and grid lines removed. Thus, FIG. 4 represents simply an icon representation of an overhead view of the driven vehicle 30. A quick glance at the display system represented in FIG. 4 would indicate to the vehicle operator that a vehicle has been detected very close to the left and rear of the vehicle as well as two additional vehicles somewhat further back directly rearward and to the right of the vehicle, and that a vehicle is at some distance forward and to the left of the driven vehicle.

Absolute distance information or change of relative distance information can be readily added to the display system of FIG. 4 by simply colorizing the icons representing the detected vehicles. Thus, a red icon can indicate either an approaching vehicle or a vehicle at an unsafe distance whereas a green icon can represent a receding vehicle or a vehicle at a safe distance from the reference vehicle 30. If a three-color scheme is employed, then a yellow icon would indicate a detected vehicle somewhat close to the reference vehicle 30, i.e., at a cautious distance.

Figures 5, 6:
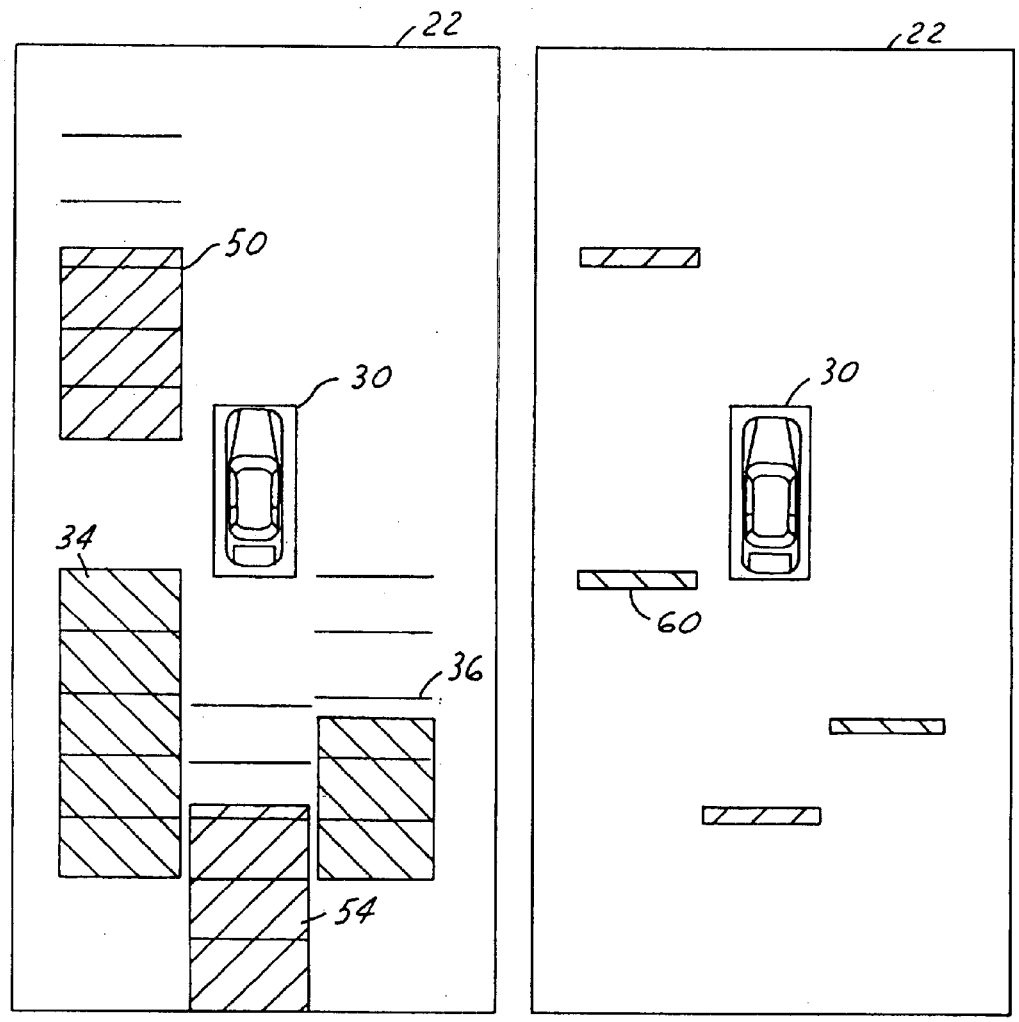
FIG. 5 is schematic view of a vehicle environment awareness display system according to another embodiment of the present invention.
FIG. 6 is schematic view of a vehicle environment awareness display system according to another embodiment of the present invention.

Referring now to FIG. 5 there is shown another embodiment of the display system according to the present invention. The display is the same as that shown in FIG. 3 with the icons identifying the detected vehicles removed. Thus, the number and color of grid lines illuminated in each display segment 34, 36, 50, 54 indicates the relative distance between the reference vehicle 30 and the detected vehicles, and the color of the illuminated display segments indicate either the change of relative direction between the reference vehicle and detected vehicle, or characterize the detected distance therebetween as "safe," "cautious," or "unsafe."

Referring now to FIG. 6 there is shown a further simplified display with respect to that shown in FIG. 5. In the example shown in FIG. 6, only one indicator element of each display segment is activated to indicate the existence of, relative distance to, and rate of change of distance with respect to a detected vehicle. Thus, for example, element 60 indicates a detected vehicle to the left and approximately inline with the rear of the driven vehicle 30. Element 60 is further colorized red to indicate an unsafe distance, or that the detected vehicle is approaching the reference vehicle.

Figure 7:
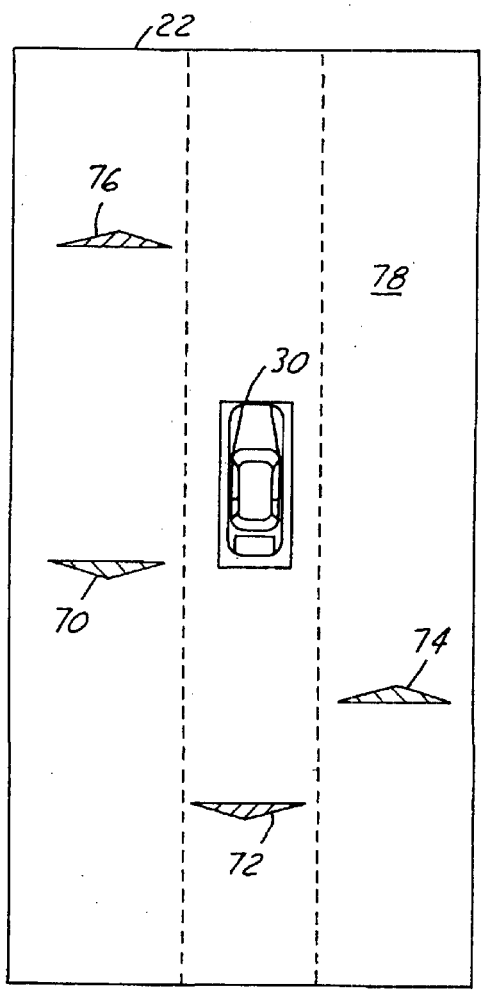
FIG. 7 is schematic view of a vehicle environment awareness display system according to another embodiment of the present invention.

Referring now to FIG. 7 there is shown a schematic diagram of another embodiment of a display system in accordance with the present invention. The display system of FIG. 7 is similar to that of FIG. 6 in that only one element of each display segment representing the various regions about the reference vehicle 30 are illuminated. In the example of FIG. 7, however, three different types of information about a detected vehicle are indicated by each activated element within a segment. For example, element 70, by its location with respect to reference icon 30, indicates a detected vehicle proximate to the reference vehicle rear bumper traveling in the left lane. The color of the element 70 (red) indicates that the detected vehicle represented thereby is very near the reference vehicle 30. The direction of the arrowhead element which is pointing away from the direction of travel of reference vehicle 30 indicates that a detected vehicle is moving in a direction away from the reference vehicle 30. Element 72 indicates a detected vehicle directly rearward of the reference 30 at a safe distance (colored green) and moving away from reference vehicle 30. Element 74 indicates a detected vehicle to the right and rearward of reference vehicle 30 at a cautious distance (colored yellow) but approaching the reference vehicle 30. Finally, element 76 represents a detected vehicle forward and left of the reference vehicle 30 moving away from the reference vehicle 30 and at a safe distance (colored green). Segment 78 is indicating no detected vehicles.

Figure 8:
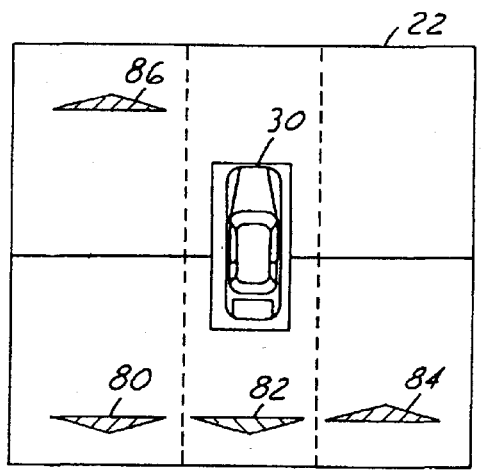
FIG. 8 is schematic view of a vehicle environment awareness display system according to another embodiment of the present invention.

FIG. 8 represents a simplified version of the diagram of FIG. 7 in that it lacks the relative distance information in its physical layout, but maintains the relative distance information color scheme of FIG. 7. Thus, element 80 of FIG. 8 conveys the same information as element 70 of FIG. 7; specifically, a red arrow pointing away from reference vehicle 30 indicating a detected vehicle to the left and rearward of the reference vehicle 30 moving away from the reference vehicle 30, but presently very close thereto. Similarly, elements 82 and 86 are colorized green to indicate detected vehicles at safe distances moving away from the reference vehicle 30. Finally, element 84 is colored yellow to indicate a detected vehicle at a cautious distance but moving toward the reference vehicle 30, presently located to the rear and to the right of reference vehicle 30. The advantage of the display system of FIG. 8 is that it can be made significantly smaller than that of the other displays yet still convey to the vehicle operator quickly, completely and accurately the information ascertained by the vehicle environment awareness sensor systems.

The arrow indicators 80, 82, 84, 86 can also be different to indicate different types of vehicles. For example, a large triangular indicator can signify a truck, while a smaller indicator can signal a detected car. Alternatively, letters can be added or used instead of the arrow indicators to identify vehicle types. Single "T," "C," or "M" indicators can signal the detection of a truck, car or motorcycle in the particular field of view region. This information can be obtained from an analysis of the optical images from camera-based systems or transmitted wirelessly along with positional information from vehicles so equipped.

Figure 9:
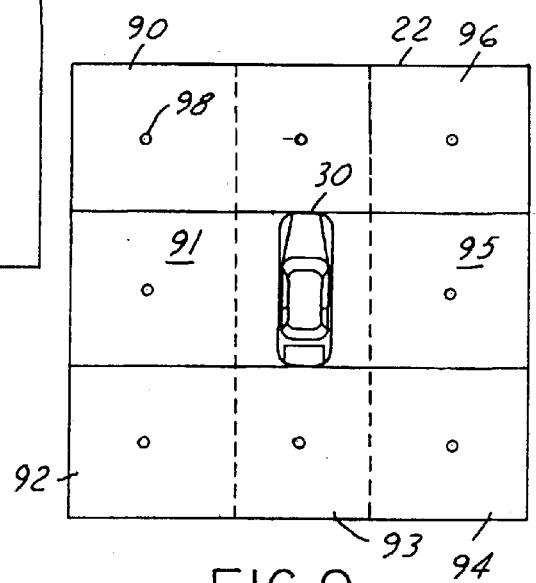
FIG. 9 is schematic view of a vehicle environment awareness display system according to another embodiment of the present invention.

Referring now to FIG. 9 there is shown yet still another embodiment of a display system in accordance with the present invention. The display system of FIG. 9 represents, in icon form, the environments surrounding the reference vehicle 30 by dividing the environment into seven regions 90–96 representing the forward-left, left, rearward-left, rearward, rearward-right, right, and forward-right regions surrounding the vehicle 30, respectively. Within each display segment 90–96, there exists a single indicator element 98 which, when activated, indicates the presence of another vehicle within the region represented by the respective display segment. In its simplest form, the display of FIG. 9 would merely indicate the presence or absence of detected vehicles around the reference vehicle 30. Alternatively, the indicator elements 98 can be colorized to convey additional information regarding a detected vehicle within the respective region represented by the display segment. Thus, as in the previous examples, the colors red, yellow and green may indicate detected vehicles at "unsafe", "cautious", and "safe" distances from the reference vehicle 30, respectively. Alternatively, the colors red and green may be used to indicate that a detected vehicle is either approaching or receding, respectively, from reference vehicle 30.

In all of the foregoing examples, the information displayed is continuously updated by controller 20 as it is received and processed from the particular vehicle environment awareness systems of the vehicle.

From the foregoing, it can be seen that there has been brought to the art a new and improved vehicle environment awareness display system which provides, at a glance, accurate and complete information regarding the physical surroundings of a driven vehicle. While the invention has been described in connection with one or more embodiments, it should be understood that the invention is not limited to those embodiments. For example, although the colors red, yellow and green have been used to indicate absolute or varying distance information, any desired colors may be substituted therefore. Numerous other modifications may be made by those of skill in the art, particularly in light of the foregoing teachings. Accordingly, the invention covers all alternatives, modifications and equivalents as may be included within the spirit and scope of the appended claims.

What is claimed is:

1. An overhead-view display system for a vehicle comprising:
    a reference vehicle indicator within an overhead field of view, indicative of said vehicle within an operating environment; and
    at least three field of view display segments wherein each display segment represents a physical region adjacent said vehicle and wherein each display segment comprises a first indicator element adapted to display the existence of another vehicle within said region and a relative distance between said vehicle and said another vehicle, and wherein each display segment comprises a second indicator element adapted to display a direction of change of relative distance between said vehicle and said another vehicle.

2. An overhead-view display system according to claim 1 wherein each display segment comprises multiple indicator elements.

3. An overhead-view display system according to claim 1 wherein each display segment comprises multiple indicator elements each representing a different distance from said vehicle.

4. An overhead-view display system according to claim 1 wherein each of said first indicator elements is adapted to indicate at least two different colors wherein each color is indicative of a relative distance between said vehicle and said another vehicle.

5. An overhead-view display system according to claim 3 wherein each indicator element is adapted to indicate at least two different colors wherein each color is indicative of a relative distance between said vehicle and said another vehicle.

6. An overhead-view display system according to claim 1 wherein said relative distance between said vehicle and said another vehicle is indicated by activating said first indicator element at a correlated distance within said display segment from said reference vehicle.

7. An overhead-view display system according to claim 1 wherein said second indicator element is adapted to change color as a function of said direction of change of relative distance between said vehicle and said another vehicle.

8. An overhead-view display system according to claim 1 wherein said second indicator element comprises a direction arrow.

9. An overhead-view display system according to claim 1 wherein said first indicator element is adapted to change color as a function of said relative distance between said vehicle and said another vehicle and said second indicator element comprises a direction arrow.

10. An overhead-view display system according to claim 1 wherein said at least three field of view display segments correspond to regions rearward, left-rearward, and right-rearward of said vehicle.

11. An overhead-view display system according to claim 10 wherein said at least three field of view display segments includes regions left-forward and right-forward of said vehicle.

12. An overhead-view display system for a vehicle comprising:
    a reference vehicle indicator within an overhead field of view, indicative of said vehicle within an operating environment; and
    at least three field of view display segments wherein each display segment represents a physical region adjacent said vehicle and wherein each display segment comprises first indicator means for displaying the existence of another vehicle within said region and a relative distance between said vehicle and said another vehicle, and wherein each display segment comprises second indicator means for displaying a direction of change of relative distance between said vehicle and said another vehicle.

13. An overhead-view display system according to claim 12 wherein said first indicator means comprises an icon.

14. An overhead-view display system according to claim 12 wherein said first indicator means comprises a colored diode.

15. An overhead-view display system according to claim 12 wherein said second indicator means comprises a dual-colored diode wherein each color is activated as a function of a direction of change of relative distance between said vehicle and said another vehicle.

* * * * *